Dec. 21, 1954    C. C. HUTCHINS ET AL    2,697,810
SINGLE PHASE INDUCTION MOTOR
Filed Aug. 30, 1950
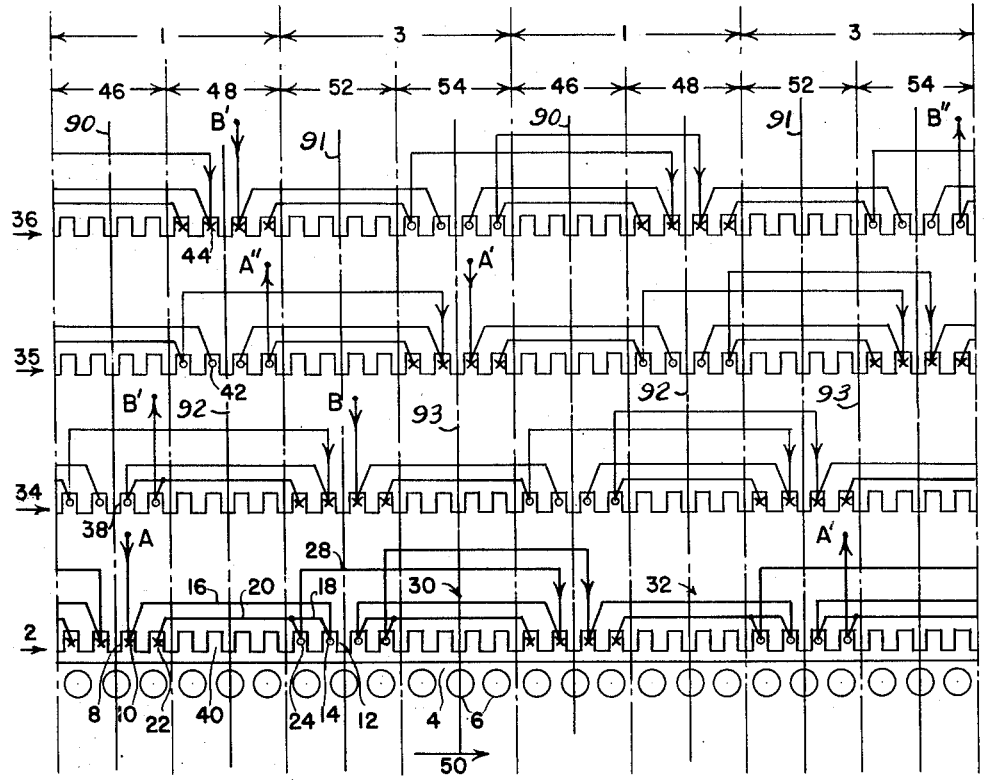
FIG. 1.
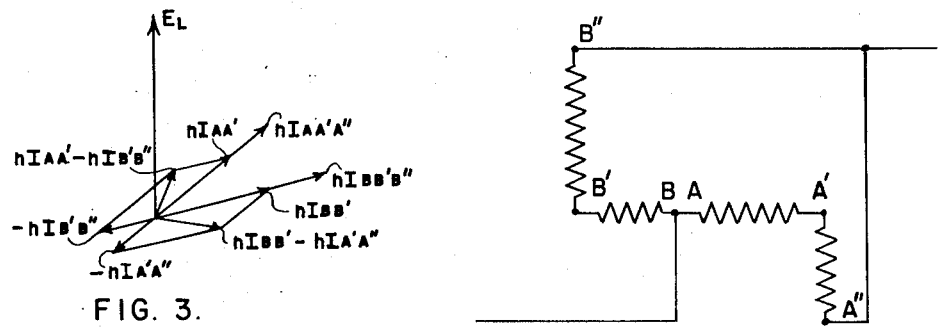
FIG. 3.
FIG. 2.
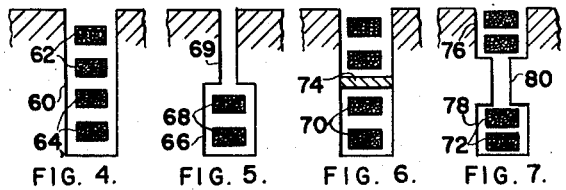
FIG. 4.    FIG. 5.    FIG. 6.    FIG. 7.
INVENTORS
CHARLES C. HUTCHINS
& BLAIR C. SEAMAN
BY
ATTORNEYS.

United States Patent Office 2,697,810
Patented Dec. 21, 1954

2,697,810

SINGLE PHASE INDUCTION MOTOR

Charles C. Hutchins and Blair C. Seaman, Ridgway, Pa., assignors to Hutchins Electric Company, Inc., Ridgway, Pa., a corporation of Pennsylvania Application August 30, 1950, Serial No. 182,329

7 Claims. (Cl. 318—220)

This invention relates to electric motors and more particularly to single phase alternating current induction motors.

This invention represents improvement and a further development of the motor disclosed in our co-pending patent application, Hutchins and Seaman, Serial No. 177,634, dated August 4, 1950.

Various means are conventionally employed for starting alternating current motors. Among those most generally employed is the induction-repulsion motor having a rotor including windings which are employed for starting and which are short circuited by centrifugally operated switching means to provide the conventional induction motor rotor.

Induction motors are frequently provided with exterior means such as condensers or reactors to cause a phase displacement of the current flowing through one or some of the motor windings to provide starting torque. When the motor comes up to speed, these external elements are disconnected from the motor circuit by means of centrifugally operated switching means or relays.

These conventional starting means all provide only a limited phase displacement between the currents giving rise to starting torque, and it will be recognized that the employment of external elements and the employment of centrifugal starting elements give rise to maintenance problems and represent added expense in motor manufacture.

It is an object of the present invention to provide a self-starting induction motor in which all of the motor windings are continuously energized during both starting and running operation of the motor.

It is another object of this invention to provide windings for an induction motor which will provide a self-starting motor which does not require external apparatus and which does not require switching means for other apparatus for deenergizing a portion of the motor windings when the motor comes up to speed.

It is a further object of this invention to provide a self-starting motor which will have improved starting torque due to the existence of increased phase displacement between the currents giving rise to the starting torque.

These and other objects of the invention will become apparent from the following description when read in conjunction with the accompanying drawing in which:

Figure 1 is a diagrammatic representation of the motor windings disposed in winding slots in accordance with the present invention;

Figure 2 is a diagrammatic showing of the electrical connections of the windings shown in Figure 1;

Figure 3 is a vector diagram of the conditions existing in the motor windings at the instant the motor is started; and Figures 4–7 are fragmentary showings of motor stators containing various forms of winding slots.

Referring to Figure 1 there is shown in developed form stator winding slots 2, the motor rotor 4, rotor conductor bars 6 and a set of stator winding coils AA'.

The current enters the winding at the connection A and passes through a conductor 10 lying in the rotor slot 8 in a direction away from the viewer as indicated by the "x," representative of the tail end of an arrow. The current then passes from the far end of the slot 8 to the far end of the slot 12 through a conductor not shown and returns toward the viewer through a conductor 14 lying in slot 12 as indicated by the "o" which is representative of the point of an arrow. The current then passes through a conductor 16 to the next turn lying in slot 8 and circulates through a plurality of winding turns as indicated by the numerals 10, 14 and 16. After passing through this winding, the current flows through the connection 18 through the winding coil 20 and flows through a plurality of conductors as indicated by 20, 22 and 24, finally emerging from this winding through the connection 28 and passes through the next winding indicated generally at 30, and then to the winding indicated at 32, and thus successively through coils of alternating plurality around the stator and finally emerging at the connection A'. It will be recognized by one skilled in the art that this is a conventional showing for a motor winding. It should be noted that this disclosure refers to an alternating current circuit and thus all reference to polarities and current directions are made with regard to instantaneous conditions.

There are also shown in Figure 1 the winding slots 34, 35 and 36 containing respectively the windings BB', A'A" and B'B" which are similar to the winding AA'. The winding slots 34, 35 and 36 merely represent repeated showings of the winding slot 2 and are drawn in this fashion in order that the various stator windings may be clearly shown. It will be apparent that the windings BB' and the windings AA' lie adjacent to each other in the same winding slots, thus the winding slot 8 will contain the conductors 10 of the winding coil AA' and will also contain the conductors 38 of the winding coil BB', and the winding slot 40 will contain the conductors 42 of the winding A'A" and also the conductors 44 of the winding B'B".

The coils of winding AA' are wound with a greater number of turns than the coils of winding BB', and the coils of the winding B'B" are wound with a greater number of turns than the coils of the winding A'A". These windings are connected to each other and the power supply line as shown in Figure 2. It will be noted that the coils of the windings AA' contain a greater number of turns than the coils of the windings BB' and that these two windings are displaced 180 electrical degrees with respect to each other. The coils of the winding A'A" are displaced 90 electrical degrees from the coils of the winding AA'. The coils of the winding B'B" are displaced 90 electrical degrees from the coils of the winding BB'. The coils of the windings A'A" and B'B" are displaced 180 electrical degrees from each other. This arrangement of motor windings gives rise to motor operation as will be hereinafter described.

The polar axes of the A—A' and B—B' windings are shown at 92 and 93, and the polar axes of the A'—A" and the B'—B" windings are shown at 90 and 91. To simplify the discussion which follows, reference is made to polar areas as existing under coil sides rather than to poles centered on polar axes. The same result can be reached by either convention but the discussion is greatly simplified by the use of reference to coil sides as defining a polar area.

Referring again to Figure 1, the areas 1 and 3 may be assumed to be the north and south polar areas respectively on the motor stator and each polar area is divided into two parts. The polar areas 46 contain coils of the AA' windings and coils of the BB' windings. Assuming the coil sides marked "x" to give rise to a north polar area and coil sides marked "o" will give rise to a south polar area. It will be seen that these windings are disposed in substantially magnetic subtractive relationship and may be referred to as being differentially related. Due to the fact that the coils of the winding AA' have a greater number of turns than the coils of the winding BB', it will be obvious that the areas 46 will be predominately north polar areas on starting.

The remaining areas 48 contain coil sides of the windings A'A" and B'B". It will be observed that these windings are also located in the winding slots in substantially differential relationship with respect to each other. The coils of the winding B'B" containing a greater number of turns than the coils of the winding A'A" will give rise to a predominately north polar condition in this polar area on starting. Thus each pole is divided into two polar areas, each predominately north but area 46 being made predominately north by the current in the A winding and area 48 being made predominately north by the current in the B winding.

Proceeding around the machine in the direction of rotor rotation as indicated by the arrow 50, the first area 46 contains windings AA'<sub>N</sub>—BB's and the second area 48 contains windings B'B''<sub>N</sub>—A'A''<sub>S</sub>. The next area 52 contains the windings AA'<sub>S</sub>—BB'<sub>N</sub> and the next area 54 contains the windings B'B''<sub>S</sub>—A'A''<sub>N</sub>. This arrangement of windings is repeated successively around the machine as indicated in the drawing. It will be noted in each case that the controlling winding is indicated as positive and the subtractive winding is indicated as negative.

In order to provide phase displacement to create starting torque, it is necessary upon starting that the currents in these two windings be displaced, thus the windings are provided with dissimilar resistance and reactance values. This is accomplished by providing, for example, in the BB'B'' winding a greater number of turns and possibly locating the windings in the bottom of the slots, by providing in the AA'A'' windings a lesser number of turns and locating the windings in the top of the winding slots, and by making the AA'A'' windings of less resistance than the BB'B'' windings. This is the generally customary construction of windings to provide starting torque, and such a winding arrangement is shown in Figure 4 wherein the slot 60 is a conventional rectangular slot containing windings 62 and 64 which, for example, could be windings AA' and BB' respectively.

Alternate slot constructions are shown in Figures 5, 6 and 7. It will be apparent that these slot constructions will add to the reactance of the high reactance winding thereby making it possible to employ such a winding with a lesser number of turns than would be required with the windings disposed in slots such as the slots shown in Figure 4. In Figure 5 there is shown a slot 66 which is spaced into the core a substantial distance from the air gap and may be connected thereto by the narrow slot 69. This type of slot has been disclosed in connection with the type of motor shown in the copending Charles C. Hutchins patent application Serial No. 63,116 filed December 2, 1948. Figures 6 and 7 also show winding slots wherein the windings 70 and 72 respectively are placed a substantial distance from the air gap and have a completely closed or a substantially completely closed metallic path for the magnetic field around the conductor. In Figure 6 this path is provided by means of a metallic wedge 74 disposed within a rectangular winding slot. This has been found to be somewhat unsatisfactory due to the fact that vibration of the wedge 74 will cause a noisy motor and will result in wear of the insulation of the winding conductors. The type of winding slot shown in Figure 7 is much more satisfactory. It provides an upper portion 76 and a lower portion 78 each of which may contain winding bands and which are connected by a narrow slot 80 which will serve to effectively increase the reactance value of the lower winding to a value far greater than the reactance value of the same number of turns when disposed, for example, as coils 64 in a winding slot of the value of the slot 60.

Referring to the vector time diagram in Figure 3 showing the conditions existing within the windings on starting, there is shown the line voltage $E_L$ and the winding vectors of the two windings $nI_{AA'A''}$ and $nI_{BB'B''}$. These vectors are illustrated as both lagging the impressed voltage and with the current in the A winding in advance of the current in the B winding as required by the previously referred to higher value of reactance built into the B winding. In the notation $nI_{AA'A''}$, $n$ represents the total number of turns of the coils of the winding AA'A'', and I represents the current through the winding AA'A''. Since the negative turns in the winding BB' are selected to be less in number than the positive turns in the winding AA' in the same zone, the vector $nI_{AA'}-nI_{B'B''}$ is positive and is positioned in advance of the A winding vector, and since the negative turns of the winding A'A'' are less in number than the positive turns in the winding B'B'' in the same zone, the vector $nI_{BB'}-nI_{A'A''}$ is positive and is positioned behind the B winding vector and assumes a position approximately 90 electrical degrees lagging from the vector $nI_{AA'}-nI_{B'B''}$. The action of this winding arrangement is to provide a much greater displacement between the fields generated across the pole areas in the regions 46 and 48 and in the regions 52 and 54 than had been previously possible and thus a much greater starting torque is created for equivalent machines than had been heretofore possible.

While this explanation of the starting of the present machine represents a considerable departure from the more generally accepted explanations regarding the production of starting torque in single phase machines, it will be apparent to one skilled in the art that this explanation may be applied to a conventionally wound motor employing the conventional pair of paralleled windings.

Windings disposed as disclosed herein may be employed with the arrangement disclosed in our above mentioned patent application dealing with the balancing of the induced voltage within the windings of a motor to produce a countervoltage in one of the windings substantially equal to the line voltage impressed on the motor when the motor is running at normal operating speed by properly selecting the winding turn ratios and winding turn displacement. In accordance with the disclosure set forth herein current flowing in circuit A will establish a leakage flux that does not link with the motor rotor conductor bars. Most of this flux, however, due to the continuous side by side disposal of the windings, in common slots, will link with the winding of circuit B. After coils of the winding A are thus linked to the coils of the winding B through the linkage of leakage flux, a transformer action or magnetic coupling occurs and, as in any transformer, the voltage induced in the B winding coils by the action of the current flowing in the A winding coils is opposite in phase and proportional in magnitude to the relative number of conductors involved in the transfer. By selecting the proper number of turns of the coils in the B windings with respect to the total number of turns in the A winding, the countervoltage in one of the windings can be made substantially equal to the supply voltage impressed upon that winding during normal running operation of the machine, thereby reducing the value of the current flow through that winding during running operation of the machine to substantially a zero value or to a value selected to suit the capacity of the winding.

By way of example of representative turn ratios, windings such as disclosed herein could be, for example, winding AA' 700 turns, winding A'A'' 300 turns equalling 1000 turns total for the AA'A'' windings; and winding BB' 200 turns and winding B'B'' 1000 turns equalling 1200 turns total for the BB'B'' windings. It will be apparent that these turn ratios will permit the winding arrangement as disclosed herein for starting in which the BB'B'' winding has the greater number of turns and is the high reactance winding, and in which the AA' winding and the B'B'' winding are the dominating windings during starting.

It will also be apparent that by means of the employment of winding slots such as shown in Figures 4–7 the winding turn ratios may be adjusted to cause the running current to diminish in either of the parallel windings as may be desired. It will also be apparent that more complex forms of motor windings than those disclosed herein may be developed by carrying forward these teachings.

When the motor comes up to speed, the current $I_B$ in the BB'B'' winding may be reduced to substantially a zero value because of the countervoltage induced therein and the current $I_A$ in the AA'A'' winding will have dropped to a normal running value. Under these conditions, the polar areas 46 and 48 under the north poles will be north and south respectively, and the areas 52 and 54 will be south and north respectively, thus the motor will run on the A winding alone with the same number of poles as it had upon starting but with the polar areas shifted 90° opposite the direction of rotation.

While the motor as disclosed herein is shown to have a winding arrangement which provides the 90° polar area shift as described above when the current in the BB'B'' winding is reduced to zero it will be apparent that the direction and division of the currents may be such as to, in effect, double the number of poles for running; that is, for example, the area 46 would be north, 48 would be south, 52 would be north, 54 would be south and so forth around the machine. The effect of this would be to double the number of poles during running over the number of poles existing during starting.

The winding distribution disclosed herein can be very effectively used in combination with capacitor motors permitting the use of the capacitor in determining the relative position of the two resulting currents, and at the same time taking fullest advantage of the field differences obtained by the winding arrangement disclosed herein and indicated in the vector diagram of Figure 3. Under these conditions a cut-out switch could be used to remove the capacitor and one of the motor windings from the circuit during running operation of the motor and the internal voltage balancing feature would not be required.

It should be noted that in some cases it may be desirable or convenient to distribute the differential windings over only some of the poles or on alternate poles. This will be recognized by those skilled in the art as an obvious variation of the system disclosed herein. It will be equally obvious that a motor of any desired number of poles and of pairs of poles may be constructed to employ this system and further that, as is well known, the primary or secondary motor windings may be located on either the rotor or the stator without deviating from the invention as disclosed herein. These and other modifications may be made to the embodiment of the invention disclosed herein without departing from the scope of the invention as set forth in the following claims.

What is claimed is:

1. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and the winding sections whose axes coincide being in mutually inductive and substantially differential relation to produce a substantial phase displacement between the winding currents for motor starting.

2. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and the winding sections whose axes coincide being in mutually inductive and substantially differential relation, the mutually inductive sections of the windings providing a countervoltage in one of said windings to produce a substantial phase displacement between the winding currents for motor starting and to produce in combination with the normally existing motor countervoltage induced therein a reducing phase displacement between the winding currents as the motor speed approaches normal running speed.

3. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and the winding sections whose axes coincide being in mutually inductive and substantially differential relation, the mutually inductive sections of the windings providing a countervoltage in one of said windings to produce a substantial phase displacement between the winding currents for motor starting and to produce in combination with the normally existing motor countervoltage induced therein a substantially inphase condition between the winding currents when the motor is operating at normal running speed.

4. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and the winding sections whose axes coincide being in mutually inductive and substantially differential relation and one of said sections having substantially higher leakage reactance than the section in mutually inductive relation therewith to produce a substantial phase displacement between the winding currents for motor starting.

5. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and the winding sections whose axes coincide being in mutually inductive and substantially differential relation, said first section of said first winding having a greater number of turns than said first section of said second winding and said second section of said first winding having a lesser number of turns than said second section of said second winding, the mutually inductive sections of the windings providing a countervoltage in one of said windings to produce a substantial phase displacement between the winding currents for motor starting and to produce in combination with the normally existing motor countervoltage induced therein a reducing phase displacement between the winding currents as the motor speed approaches normal running speed.

6. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and the winding sections whose axes coincide being in mutually inductive and substantially differential relation, said first section of said first winding having a greater number of turns than said first section of said second winding and said second section of said first winding having a lesser number of turns than said second section of said second winding, said second section of said first winding having substantially higher leakage reactance than the section in mutually inductive relation therewith, the mutually inductive sections of the windings providing a countervoltage in one of said windings to produce a substantial phase displacement between the winding currents for motor starting and to produce in combination with the normally existing motor countervoltage induced therein a reducing phase displacement between the winding currents as the motor speed approaches normal running speed.

7. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and substantially all of the turns of the winding sections whose axes coincide being in mutually inductive and substantially differential relation, the mutually inductive sections of the windings providing a countervoltage in one of said windings to produce a substantial phase displacement between the winding currents for motor starting and to produce in combination with the normally existing motor countervoltage induced therein a reducing phase displacement between the winding currents as the motor speed approaches normal running speed.

References Cited in the file of this patent

UNITED STATES PATENTS

| Number | Name | Date |
|---|---|---|
| Re. 11,783 | Duncan | Nov. 7, 1899 |
| 416,195 | Tesla | Dec. 3, 1889 |
| 750,940 | Brown | Feb. 2, 1904 |
| 1,859,368 | Kennedy | May 25, 1932 |